Figure 1:
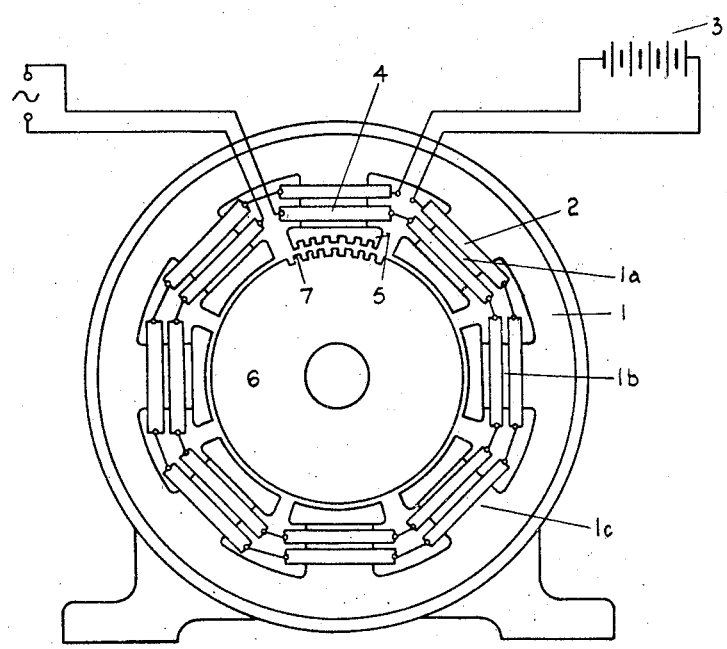

Nov. 18, 1947.  R. D. BALL  2,431,223

HETEROPOLAR INDUCTOR ALTERNATOR

Filed Sept. 20, 1944  2 Sheets-Sheet 1

INVENTOR
Reginald D. Ball.
BY
ATTORNEY

INVENTOR
Reginald D. Ball.
BY
ATTORNEY

Patented Nov. 18, 1947

2,431,223

UNITED STATES PATENT OFFICE 2,431,223

HETEROPOLAR INDUCTOR ALTERNATOR

Reginald Donahoe Ball, Bradford, England, assignor to The English Electric Company Limited, London, England, a British company Application September 20, 1944, Serial No. 554,881
In Great Britain September 22, 1943

4 Claims. (Cl. 171—252)

In a heteropolar inductor alternator with armature and D. C.-supplied exciting windings disposed in slots between poles around an armature core, a very small pole pitch and hence small slots gives inadequate space for the windings. There is thus a limit to the frequency obtainable if this be determined in part by the number of poles.

In order to obtain higher frequencies with a number of poles chosen from magnetic considerations so as to keep the iron losses low, while leaving between the poles adequate space for the windings, the arrangement may be such that the frequency is determined by the relative speed of the cores and the number of fine teeth provided on the inductor core, which number is larger than the number of poles on the armature core. The armature pole faces between the slots are also provided with finely pitched teeth so located that when the teeth on some poles are opposite inductor teeth, the reluctance in the air gap under those poles being then at a minimum, the teeth on other poles are opposite the gaps between inductor teeth, the reluctance in the air gap under those other poles being then at a maximum. In such a machine the relative motion thus causes the reluctance in the air gaps opposite some poles to increase from a minimum to a maximum while that in the gaps opposite other poles is decreasing from a maximum to a minimum, the frequency of complete cycles of flux being greater than V/P where V is the peripheral speed and P the pole pitch. The maximum frequency obtainable is limited only by the maximum allowable peripheral speed and the minimum size of tooth which can practically be punched, machined or engraved in the core laminations.

The present invention consists in a novel arrangement of such an inductor alternator having for its object, among other things, to utilise the available slot spaces to the full. According to the primary feature of the invention the D. C. exciting windings are wound in all the slots of the armature core, there being thus turns of the exciting winding enveloping each armature pole— i. e. each pole is embraced by a field coil lying in two immediately adjacent slots.

According to a further important feature of the invention and with the object of reducing to a minimum the induced alternating E. M. F. between points in the D. C. exciting winding, the latter is made up either of a number of single turn coils in series or a number of pre-formed coils of figure 8 shape embracing adjacent pairs of poles of opposite polarity.

Figure 2:
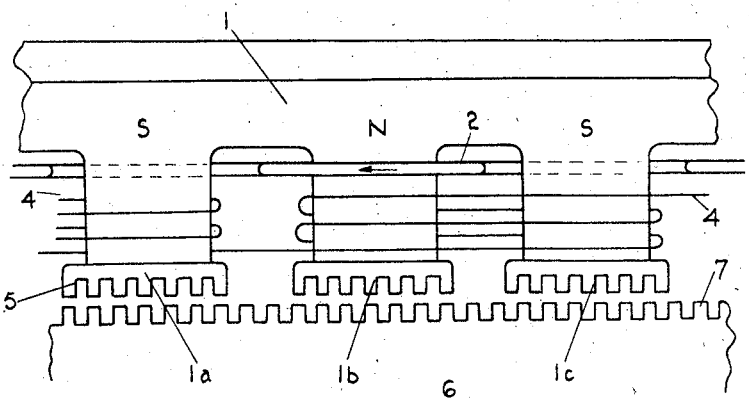
Figure 3:
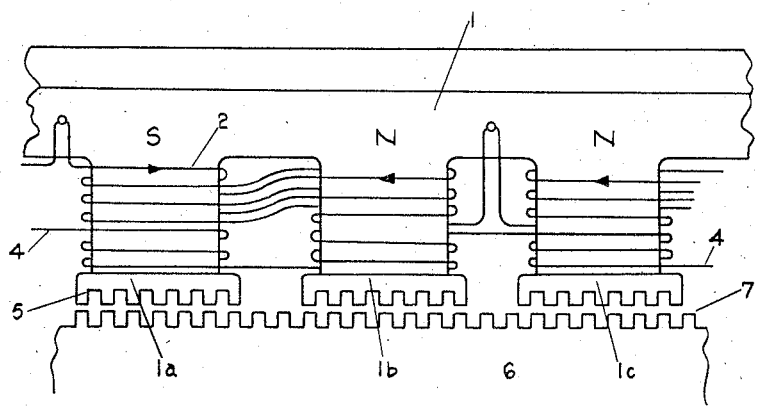
Figure 4:
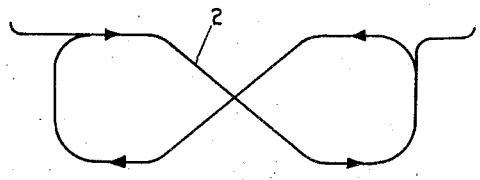

The invention is illustrated by the accompanying drawings of which:

Fig. 1 is an end view of a heteropolar inductor alternator according to the invention, Fig. 2 is an enlarged development of some of the poles and the adjacent part of the inductor of the machine shown in Fig. 1, showing one arrangement of windings, Fig. 3 is again an enlarged development of some of the poles and the adjacent part of the inductor of the machine shown in Fig. 1 but showing another arrangement of windings, while Fig. 4 is a separate view of one of the pre-formed field coils of Fig. 3.

In Fig. 1 the laminated armature core 1 is stationary and slotted to provide a number of internally projecting salient poles 1a, 1b, etc. This core carries the exciting field winding 2 supplied from the D. C. source 3 and the armature winding 4 from which the output is derived. In accordance with the invention the field winding 2 is wound around each of the poles and in all the slots between poles. The faces of the poles 1a, 1b, etc., between the main slots are slotted to provide a large number of very small teeth 5. The laminated inductor 6, which is the rotor lying within the stator, is uniformly slotted with teeth 7 of the same angular pitch. The pole pitch alternates between two values, the pitch from pole 1a to pole 1b differing from the pitch from pole 1b to pole 1c by half the pitch of the teeth.

The field winding 2 shown in Fig. 2 consists of a conductor passing through one slot, around one pole, back through the next slot, around the next pole and so on progressively around the core, each loop providing a single turn winding around each pole, the poles alternating in polarity.

The armature winding 4 is shown in Fig. 2 wound in alternate slots. Each armature coil embraces two adjacent poles of opposite polarity. Due to the said relationship of the tooth pitch to the varying pole pitch, the stator teeth 5 and inductor teeth 7 under the south pole 1a are substantially in line to give minimum reluctance in the air gap under that pole when the teeth corresponding to the adjacent pole 1b, which is a north pole and is linked with the adjacent armature coil are also in line to give minimum reluctance, while the teeth corresponding to the south pole 1c linked wtih the same armature coil as the north pole 1b will be substantially out of line to give maximum reluctance in the air gap, as will also be the teeth under the next pole, which is a north pole, and so on.

The action is as follows:

On movement of the rotor through half a tooth pitch the maximum and minimum reluctance conditions will reverse. Accordingly during such movement there will be a change from a close coupling of an armature coil with the exciting coil of one of the poles (e. g. pole 1b) which it embraces to a close coupling of that same armature coil with the oppositely wound exciting coil of the other pole (the pole 1c) which it embraces and a complete reversal of the direction of the flux linkage with said armature coil. An E. M. F. is accordingly induced in armature winding 4; the frequency will be V/P where V is the peripheral velocity and P the tooth pitch—e. g. with a tooth pitch of 0.08 inch a speed of 300 ft. per sec. will be required to give a frequency of 45,000~ per sec. Much higher frequencies can be obtained without an undue increase in actual peripheral speed by rotating the armature core in the opposite direction to the inductor core, said inductor core, which is unwound, preferably being the outside member, so as to increase the relative velocity, the armature and field windings being connected to slip rings.

If the form of the field winding 2 shown in Fig. 2 be continued around the stator core several times to provide a considerable number of single-turn coils in series, the winding is costly to produce. The coils cannot be pre-formed. If the winding goes only once around the core the source 3 may have to supply a relatively high current at a low voltage.

Figs. 3 and 4 show an alternative form of the field winding 2 permitting a higher E. M. F. and lower exciting current and comprising a plurality of coils of figure 8 shape, the number of coils being equal to the number of pairs of poles and placed over pairs of adjacent poles. As can be seen in Fig. 3 each coil is formed of turns around one pole alternating with turns going in the opposite direction around the next pole, the resulting figure 8 shape of the coil appearing in Fig. 4. Such coils can be pre-formed and electrically connected together after being put in place on the poles.

Fig. 3 shows alternate figure 8 coils reversed relatively to the others so that the pole arrangement is NNSS. This Fig. 3 also shows the armature windings wound in all the slots so that there is an armature coil around each pole, alternate coils being oppositely disposed. The stator teeth 5 and inductor teeth 7 under a pair of poles comprising a south pole 1a and the adjacent north pole 1b are substantially in line to give minimum reluctance when the teeth under the next pair of poles are substantially out of line to give maximum reluctance. The action will be substantially as described with reference to Fig. 2. During relative movement through half a tooth pitch there will be a change from close coupling between one or more pairs of armature coils and their associated north and south pole field coils to close coupling between the remaining and oppositely connected pairs of armature coils and their associated north and south pole field coils.

The alternating E. M. F.'s induced in the field winding 2 by the alternating flux sum to substantially zero around the whole field circuit. With a winding as in Fig. 2, furthermore, the E. M. F. induced in one turn is almost completely balanced by the opposite E. M. F. induced in the next turn so that the maximum alternating P. D. between any two points in the field circuit is limited to the E. M. F. induced in one turn. The same is true of the field winding as in Figs. 3 and 4 if each single turn around the north pole part of the figure 8 coil is immediately succeeded by a single turn around the south pole part, and so on.

What I claim as my invention and desire to secure by Letters Patent is:

1. A multi-pole alternating current generator of the inductor type having a stator member with a plurality of salient pole pieces thereon, each of said pole pieces having a plurality of teeth on its pole face, a rotor member having a plurality of teeth thereon, the teeth on said pole pieces being disposed so that the teeth on certain of the pole pieces are aligned with the rotor teeth when the teeth of other pole pieces are opposite the spaces between the rotor teeth, an armature winding on said pole pieces, and an exciting winding on said pole pieces, said exciting winding including a coil on each pole piece, each coil of the exciting winding consisting of at least one turn, and each turn being connected in series with an oppositely wound turn on an adjacent pole piece of opposite polarity.

2. A multi-pole alternating current generator of the inductor type having a stator member with a plurality of salient pole pieces thereon, each of said pole pieces having a plurality of teeth on its pole face, a rotor member having a plurality of teeth thereon, the teeth on said pole pieces being disposed so that the teeth on certain of the pole pieces are aligned with the rotor teeth when the teeth of other pole pieces are opposite the spaces between the rotor teeth, an armature winding on said pole pieces, and an exciting winding on said pole pieces, said exciting winding comprising a plurality of single-turn loops of a continuous conductor wound progressively around the stator member, successive loops of said conductor being disposed on adjacent pole pieces and wound in opposite directions.

3. A multi-pole alternating current generator of the inductor type having a stator member with a plurality of salient pole pieces thereon, each of said pole pieces having a plurality of teeth on its pole face, a rotor member having a plurality of teeth thereon, the teeth on said pole pieces being disposed so that the teeth on certain of the pole pieces are aligned with the rotor teeth when the teeth of other pole pieces are opposite the spaces between the rotor teeth, an armature winding on said pole pieces, and an exciting winding on said pole pieces, said exciting winding comprising a coil on each pole piece, each coil having a plurality of turns, and each turn of each coil being connected in series with an oppositely wound turn of the coil on an adjacent pole piece of opposite polarity.

4. A multi-pole alternating current generator of the inductor type having a stator member with a plurality of salient pole pieces thereon, each of said pole pieces having a plurality of teeth on its pole face, a rotor member having a plurality of teeth thereon, the teeth on said pole pieces being disposed so that the teeth on certain of the pole pieces are aligned with the rotor teeth when the teeth of other pole pieces are opposite the spaces between the rotor teeth, an armature winding on said pole pieces, and an exciting winding on said pole pieces, said exciting winding comprising a multi-turn coil on each pole piece, said coils being wound in pairs, and each pair of coils consisting of a conductor wound back and forth around two adjacent pole pieces to form a pair of coils of substantially figure-8 configuration with one loop around each pole piece, whereby each turn of each coil is in series with an oppositely wound turn of a coil on an adjacent pole piece.

REGINALD DONAHOE BALL.

REFERENCES CITED

The following references are of record in the file of this patent:

UNITED STATES PATENTS

| Number | Name | Date |
|---|---|---|
| 680,597 | Joel | Aug. 13, 1901 |
| 1,554,438 | Lee | Sept. 22, 1926 |
| 1,160,087 | Neuland | Nov. 9, 1915 |